(12) United States Patent
Strandborg et al.

(10) Patent No.: US 11,863,788 B2
(45) Date of Patent: Jan. 2, 2024

(54) ENCODERS AND DECODERS EMPLOYING LOG-POLAR COORDINATE SYSTEM

(71) Applicant: Varjo Technologies Oy, Helsinki (FI)

(72) Inventors: Mikko Strandborg, Hangonkylä (FI); Ville Miettinen, Helsinki (FI)

(73) Assignee: Varjo Technologies Oy, Helsinki (FI)

(*) Notice: Subject to any disclaimer, the term of this patent is extended or adjusted under 35 U.S.C. 154(b) by 15 days.

(21) Appl. No.: 17/716,714

(22) Filed: Apr. 8, 2022

(65) Prior Publication Data
US 2023/0328283 A1    Oct. 12, 2023

(51) Int. Cl.
*H04N 19/60* (2014.01)
*G06F 3/01* (2006.01)
*H04N 19/167* (2014.01)

(52) U.S. Cl.
CPC ............. *H04N 19/60* (2014.11); *G06F 3/013* (2013.01); *H04N 19/167* (2014.11)

(58) Field of Classification Search
CPC ....... H04N 19/60; H04N 19/167; G06F 3/013
See application file for complete search history.

(56) References Cited

U.S. PATENT DOCUMENTS

| | | | | |
|---|---|---|---|---|
| 4,267,573 A | * | 5/1981 | Chaikin | G06V 10/32 345/682 |
| 5,103,306 A | * | 4/1992 | Weiman | H04N 11/042 348/400.1 |
| 6,252,989 B1 | * | 6/2001 | Geisler | H04N 19/63 375/E7.161 |
| 11,094,089 B1 | * | 8/2021 | Strandborg | G06T 9/00 |
| 11,568,574 B1 | * | 1/2023 | Strandborg | G06T 15/20 |

OTHER PUBLICATIONS

European Patent Office, extended European search report, U.S. Appl. No. 23/160,731, dated Apr. 5, 2023, 7 pages.
Sandini G et al: "A retina-like CMOS sensor and its applications", Sensor Array and Multichannel Signal Processing Workshop. 2000. Proceedings of the 2000 IEEE Mar. 16-17, 2000, Piscataway, NJ, USA, IEEE, Mar. 16, 2000 (Mar. 16, 2000), pp. 514-519, XP010516143, ISBN: 978-0-7803-6339-7 *figure 1*.

* cited by examiner

*Primary Examiner* — Mihir K Rayan
(74) *Attorney, Agent, or Firm* — Ziegler IP Law Group LLC

(57) ABSTRACT

An encoder for encoding images includes at least one processor configured transform a given input pixel of an input image having (x, y) coordinates in a Cartesian coordinate system into a given transformed pixel of a transformed image having ($\rho$, $\theta$) coordinates in a log-polar coordinate system, using a log-polar transformation in which a radial distance ($\rho$) of the given transformed pixel is a logarithm of a distance of the given input pixel from an origin in the Cartesian coordinate system, and an angular distance ($\theta$) of the given transformed pixel is a sum of an arctangent of a slope of a line connecting the given input pixel to the origin and a function of the radial distance, encode the transformed image, by employing a compression algorithm, into an encoded image, and send the encoded image to a display apparatus for subsequent decoding thereat.

15 Claims, 4 Drawing Sheets

ENCODERS AND DECODERS EMPLOYING LOG-POLAR COORDINATE SYSTEM

TECHNICAL FIELD

The present disclosure relates to encoders for encoding images by employing a modified log-polar coordinate system. The present disclosure also relates to methods for encoding images by employing a modified log-polar coordinate system. The present disclosure also relates to display apparatuses implementing decoders for decoding images by employing a modified log-polar coordinate system.

BACKGROUND

In recent times, there has been an ever-increasing demand for image encoding and decoding. Such a demand, for example, may be quite high and critical in case of immersive extended-reality (XR) environments, which are being employed in various fields such as entertainment, real estate, training, medical imaging operations, simulators, navigation, and the like. Such immersive XR environments are presented to a user of an XR device (such as an XR headset, a pair of XR glasses, or similar). Typically, image encoders and decoders are employed for compressing and decompressing images.

However, existing technologies for image encoding are inefficient in terms of providing a high degree of image compression without compromising on image quality. Often, some existing technologies employ a transformation of coordinates of pixels of a given image into a standard log-polar coordinate system, prior to encoding the given image. This facilitates in arranging the pixels of the given image in a manner that they mimic a way in which image receptor cells are arranged in a human eye. However, in such a case, when a standard log-polar image is encoded and subsequently decoded, pixels representing straight image features (for example, such as edges) are arranged in a sawtooth pattern. Thus, any straight line in the given image appears to have in a sawtooth pattern in a corresponding decoded image. Such a sawtooth pattern behaves like an extra high-frequency feature (such as an edge, a corner, or similar), and requires considerable processing resources. Moreover, such a sawtooth pattern also sacrifices image quality of output images (generated upon decoding of encoded images) and such a loss in the image quality is perceivable. This reduces user's immersion when the (suboptimal or unrealistic) output images are shown to the user.

Therefore, in light of the foregoing discussion, there exists a need to overcome the aforementioned drawbacks associated with existing technologies for image encoding.

SUMMARY

The present disclosure seeks to provide an encoder for encoding images by employing a modified log-polar coordinate system. The present disclosure also seeks to provide a method for encoding images by employing a modified log-polar coordinate system. The present disclosure also seeks to provide a display apparatus implementing a decoder for decoding images by employing a modified log-polar coordinate system.

An aim of the present disclosure is to provide a solution that overcomes at least partially the problems encountered in prior art.

In a first aspect, an embodiment of the present disclosure provides an encoder for encoding images, the encoder comprising at least one processor configured to:
  transform a given input pixel of an input image having (x, y) coordinates in a Cartesian coordinate system into a given transformed pixel of a transformed image having ($\rho$, $\theta$) coordinates in a log-polar coordinate system, using a log-polar transformation in which a radial distance ($\rho$) of the given transformed pixel is a logarithm of a distance of the given input pixel from an origin in the Cartesian coordinate system, and an angular distance ($\theta$) of the given transformed pixel is a sum of an arctangent of a slope of a line connecting the given input pixel to the origin and a function of the radial distance;
  encode the transformed image, by employing a compression algorithm, into an encoded image; and
  send the encoded image to a display apparatus for subsequent decoding thereat.

In a second aspect, an embodiment of the present disclosure provides a method for encoding images, the method comprising:
  transforming a given input pixel of an input image having (x, y) coordinates in a Cartesian coordinate system into a given transformed pixel of a transformed image having ($\rho$, $\theta$) coordinates in a log-polar coordinate system, using a log-polar transformation in which a radial distance ($\rho$) of the given transformed pixel is a logarithm of a distance of the given input pixel from an origin in the Cartesian coordinate system, and an angular distance ($\theta$) of the given transformed pixel is a sum of an arctangent of a slope of a line connecting the given input pixel to the origin and a function of the radial distance;
  encoding the transformed image, by employing a compression algorithm, into an encoded image; and
  sending the encoded image to a display apparatus for subsequent decoding thereat.

In a third aspect, an embodiment of the present disclosure provides a display apparatus comprising at least one light source and at least one processor configured to:
  receive an encoded image from an encoder;
  decode the encoded image, by employing a decompression algorithm, into a decoded image;
  transform a given decoded pixel of the decoded image having ($\rho$, $\theta$) coordinates in a log-polar coordinate system into a given output pixel of an output image having (x, y) coordinates in a Cartesian coordinate system, using an inverse log-polar transformation in which an x-coordinate of the given output pixel is a product of an antilogarithm of a radial distance ($\rho$) of the given decoded pixel and a cosine of a difference between an angular distance ($\theta$) of the given decoded pixel and a function of the radial distance, and a y-coordinate of the given output pixel is a product of the antilogarithm of the radial distance of the given decoded pixel and a sine of the difference between the angular distance and the function of the radial distance; and
  display the output image via the at least one light source.

Embodiments of the present disclosure substantially eliminate or at least partially address the aforementioned problems in the prior art, and enable efficient, accurate, reliable encoding and decoding of images by way of employing a modified log-polar coordinate system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3A illustrates an exemplary arrangement of pixels of an image having coordinates in a standard log-polar coordinate system, while FIG. 3B illustrates an exemplary arrangement of pixels of a transformed image having coordinates in a modified log-polar coordinate system of the present disclosure;

FIG. 4A illustrates how pixels of an image having coordinates in a standard log-polar coordinate system are encoded, while

FIG. 5A illustrates an image generated upon encoding and subsequent decoding of an input image that was transformed according to a standard log-polar coordinate system, while

Figure 1:
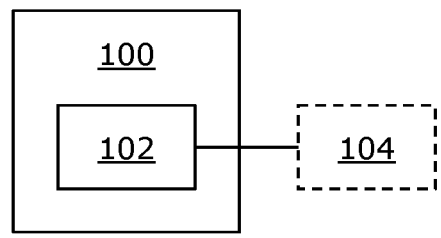
FIG. 1 illustrates a block diagram of an architecture of an encoder for encoding images by employing a modified log-polar coordinate system, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an encoder for encoding images, the encoder comprising at least one processor configured to:

transform a given input pixel of an input image having (x, y) coordinates in a Cartesian coordinate system into a given transformed pixel of a transformed image having ($\rho$, $\theta$) coordinates in a log-polar coordinate system, using a log-polar transformation in which a radial distance ($\rho$) of the given transformed pixel is a logarithm of a distance of the given input pixel from an origin in the Cartesian coordinate system, and an angular distance ($\theta$) of the given transformed pixel is a sum of an arctangent of a slope of a line connecting the given input pixel to the origin and a function of the radial distance;

encode the transformed image, by employing a compression algorithm, into an encoded image; and send the encoded image to a display apparatus for subsequent decoding thereat.

In a second aspect, an embodiment of the present disclosure provides a method for encoding images, the method comprising:

transforming a given input pixel of an input image having (x, y) coordinates in a Cartesian coordinate system into a given transformed pixel of a transformed image having ($\rho$, $\theta$) coordinates in a log-polar coordinate system, using a log-polar transformation in which a radial distance ($\rho$) of the given transformed pixel is a logarithm of a distance of the given input pixel from an origin in the Cartesian coordinate system, and an angular distance ($\theta$) of the given transformed pixel is a sum of an arctangent of a slope of a line connecting the given input pixel to the origin and a function of the radial distance;

encoding the transformed image, by employing a compression algorithm, into an encoded image; and sending the encoded image to a display apparatus for subsequent decoding thereat.

In a third aspect, an embodiment of the present disclosure provides a display apparatus comprising at least one light source and at least one processor configured to:

receive an encoded image from an encoder;

decode the encoded image, by employing a decompression algorithm, into a decoded image;

transform a given decoded pixel of the decoded image having ($\rho$, $\theta$) coordinates in a log-polar coordinate system into a given output pixel of an output image having (x, y) coordinates in a Cartesian coordinate system, using an inverse log-polar transformation in which an x-coordinate of the given output pixel is a product of an antilogarithm of a radial distance ($\rho$) of the given decoded pixel and a cosine of a difference between an angular distance ($\theta$) of the given decoded pixel and a function of the radial distance, and a y-coordinate of the given output pixel is a product of the antilogarithm of the radial distance of the given decoded pixel and a sine of the difference between the angular distance and the function of the radial distance; and display the output image via the at least one light source.

The present disclosure provides the aforementioned encoder for encoding images, the aforementioned method for encoding images, and the aforementioned display apparatus for decoding images. Herein, the encoding and decoding are performed by employing a modified log-polar coordinate system, which facilitates in transforming the input image into the transformed image in which pixels are arranged on a natural spiralling path (that forms from diagonals of squares in the log-polar coordinate system). Resultantly, this enables in encoding the transformed image into the encoded image in a smooth and gradual manner. Advantageously, this facilitates in significantly improving compression efficiency in encoding without any perceivable loss in image quality, and the transformed image can be efficiently and reliably compressed using any suitable, existing image compression algorithm. Furthermore, the encoded image requires minimal storage and transmission resources. Moreover, an image quality of output images is high, as image features (for example, such as edges and straight lines) do not appear to have any sawtooth pattern. This enhances user's immersion when the (realistic) output images are shown to the user. The encoder and the method are simple, robust, fast, reliable and can be implemented with ease.

Throughout the present disclosure, the term "encoder" refers to a specialized equipment that, in operation, encodes images. The encoder encodes the transformed image to yield the encoded image, wherein the encoded image is a compact representation of visual content of the transformed image (and of visual content originally represented in the input image). The encoded image requires lesser storage and transmission resources as compared to the transformed image (and the input image). When the encoded image is communicated to the display apparatus, the encoded image is transmitted from the encoder to the display apparatus in a bandwidth-efficient manner.

Optionally, the encoder is implemented in a computing device that is communicably coupled to the display apparatus. In such a case, the computing device is remotely located from the display apparatus. Examples of the computing device include, but are not limited to, a computer, a laptop, a tablet, a smartphone, a workstation. Moreover, the computing device may be mounted on a remote device. Examples of the remote device include, but are not limited to, a drone, a vehicle, and a robot. Alternatively, optionally, the encoder is implemented in a rendering server that is communicably coupled to the display apparatus. Optionally, the rendering server is implemented as a cloud-based server.

Throughout the present disclosure, the term "display apparatus" refers to a specialized equipment that is capable of displaying images. These images are to be presented to a user of the display apparatus. Optionally, the display apparatus is implemented as a head-mounted display (HMD) device. The term "head-mounted display" device refers to specialized equipment that is configured to present an XR environment to the user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like.

Throughout the present disclosure, the term "processor" refers to hardware, software, firmware or a combination of these responsible for encoding and/or decoding images. The processor could be implemented as any one of: a microprocessor, a microcontroller, or a controller. As an example, the processor could be implemented as an application-specific integrated circuit (ASIC) chip or a reduced instruction set computer (RISC) chip. Notably, the at least one processor of the encoder controls an overall operation of the encoder, whereas the at least one processor of the display apparatus controls an overall operation of the display apparatus. Furthermore, the at least one processor of the encoder and the at least one processor of the display apparatus are communicably coupled to each other.

Throughout the present disclosure, the term "input image" refers to an image that is to be transformed and encoded, and then sent to the display apparatus. Notably, input pixels of the input image have coordinates in the Cartesian coordinate system. Optionally, the input image is an image that is captured by at least one camera. Examples of the at least one camera include, but are not limited to, a Red-Green-Blue (RGB) camera, a Red-Green-Blue-Alpha (RGB-A) camera, a Red-Green-Blue-Depth (RGB-D) camera, and a monochrome camera, a ranging camera, a Light Detection and Ranging (LiDAR) camera, a Time-of-Flight (ToF) camera, a Sound Navigation and Ranging (SONAR) camera, a stereo camera, a plenoptic camera, an infrared (IR) camera. Alternatively, optionally, the input image is an XR image, the XR image being generated by virtually superimposing a virtual object upon an image captured by at least one camera.

Furthermore, the term "transformed image" refers to a modified image that is generated from the input image upon transforming the input image from the Cartesian coordinate system to the modified log-polar coordinate system. A modification in the input image to generate the transformed image facilitates in accurate and efficient encoding of visual content of the input image, as compared to when the input image is directly encoded (i.e., without such modification). Notably, transformed pixels of the transformed image have coordinates in the log-polar coordinate system.

It will be appreciated that the input pixels and the transformed pixels comprise not only colour information represented by the input pixels and the transformed pixels, but also other attributes associated with the input pixels and the transformed pixels (for example, such as depth information, brightness information, transparency information, luminance information, and the like).

Notably, the transformation of the given input pixel into the given transformed pixel refers to a conversion of Cartesian coordinates of the given input pixel into log-polar coordinates of the given transformed pixel, using the aforementioned log-polar transformation. The benefit of employing the log-polar transformation is that it emulates how images appear on a back of a retina of a human eye. Moreover, the transformed image obtained by using the log-polar transformation is rotation invariant and scale invariant, which could be beneficial for object detection.

In some implementations, the log-polar transformation is applied to the given input pixel in a single step (namely, at one go) by using following equations (1) and (2):

$$\rho = \log\sqrt{(x-x')^2 + (y-y')^2} \qquad (1)$$

$$\theta = \tan^{-1}\left(\frac{y-y'}{x-x'}\right) + f(\rho) \qquad (2)$$

Herein, $$\frac{y-y'}{x-x'}$$

represents the slope or the line connecting the given input pixel to the origin in the Cartesian coordinate system, f(ρ) represents the function of the radial distance, (x', y') represents coordinates of the origin in the Cartesian coordinate system, and (x, y) represents coordinates of the given input pixel in the Cartesian coordinate system.

Typically, the origin in the Cartesian coordinate system lies at (0, 0). Therefore, in such cases, the aforementioned equations (1) and (2) will become as follows:

$$\rho = \log\sqrt{x^2+y^2} \quad (3)$$

$$\theta = \tan^{-1}\left(\frac{y}{x}\right) + f(\rho) \quad (4)$$

In other implementations, the log-polar transformation is applied to the given input pixel in two steps. In such implementations, the log-polar transformation:

converts the input image in the Cartesian coordinate system into an intermediate image in a standard log-polar coordinate system, wherein pixels of the intermediate image are arranged in a plurality of concentric circles whose centre is at an origin of the standard log-polar coordinate system; and rotates each concentric circle angularly about said origin by a corresponding angle-of-rotation to generate the transformed image, wherein an angle-of-rotation for a given concentric circle is a function of a radial distance of the given concentric circle from said origin.

In this regard, rotating each concentric circle angularly about said origin simply means shifting the pixels of the intermediate image in a counter-clockwise direction or a clockwise direction about an origin of the intermediate image to generate the transformed image, assuming that an axis representing an angular dimension in the intermediate image is mapped to an axis representing an angular dimension in the transformed image. Moreover, pixels that are arranged along a given radial direction in the intermediate image are arranged along a given spiralling direction in the transformed image from the origin of the log-polar coordinate system towards a periphery of the transformed image. As an example, a given circular arrangement of pixels in the intermediate image is rotated by half-a-texel (namely, a half of a distance between successive pixels in the angular dimension of the intermediate image). Such a rotation is gradually increased as a radial dimension in the intermediate image increases. The transformed image generated in this manner has a more natural distribution of transformed pixels, and is free from any high-frequency features like jagged edges or sharp corners. Resultantly, this enables in encoding the transformed image into the encoded image in a smooth and gradual manner (for example, without any sawtooth pattern in features such as edges of a corresponding output image). Beneficially, this facilitates in significantly improving compression efficiency in encoding without any perceivable loss in image quality, and the transformed image can be efficiently and reliably compressed using any suitable, existing image compression algorithm.

In an example, pixels of the intermediate image may be arranged in 10 concentric circles whose centre is at the origin of the standard log-polar coordinate system. Herein, when generating the transformed image, a first concentric circle (namely, an innermost concentric circle) is angularly rotated by 0 degree, a second concentric circle (that is adjacent to the first concentric circle) is angularly rotated by 1 degree, a third concentric circle (that is adjacent to the second concentric circle) is angularly rotated by 2 degrees, and so on until a tenth concentric circle (namely, an innermost concentric circle that is adjacent to the ninth concentric circle) is angularly rotated by 9 degrees, about said origin. Resultantly, pixels that are arranged along a radial direction in the intermediate image, are now arranged along a corresponding spiralling path in the transformed image.

Optionally, a density and/or a size of transformed pixels varies spatially across the transformed image to provide a spatially-variable resolution of the transformed image. In other words, different regions of the transformed image have different angular resolutions. In this regard, a density of transformed pixels that are arranged near (namely, in vicinity of) the origin of the log-polar coordinate system in the transformed image would be higher, as compared to transformed pixels that are arranged far from the origin. Alternatively, the size of transformed pixels that are arranged near the origin of the log-polar coordinate system in the transformed image would be smaller, as compared to transformed pixels that are arranged far from the origin. In other words, a first region of the transformed image that includes and surrounds the origin of the log-polar coordinate system has a highest angular resolution, a second region of the transformed image that surrounds the first region has a next-highest angular resolution, and so on. Therefore, it may be understood that the transformed image optionally has a variable radial resolution (i.e., its resolution varies on moving along a radial direction from the origin). A technical advantage of such variable density and/or size of the transformed pixels across the transformed image is that it emulates natural human eye vision. Upon encoding such a transformed image as described herein, the spatially-variable resolution is preserved in a manner that upon decoding, the decoded image so obtained also has the spatially-variable resolution. The angular resolution of a given image or a region of the given image is measured in terms of a number of pixels per degree (namely, points per degree (PPD)) of an angular width of the given image or the region of the given image, wherein the angular width is measured from an imaginary point in a three-dimensional space, or a number of pixels per unit area in the given image or the region of the given image. In an example, the transformed image may have three regions A, B, and C with spatially varying resolution in a manner that the region A being nearest to and including the origin has an angular resolution of 60 PPD, the region B being at an intermediate distance from the origin has an angular resolution of 40 PPD, and the region C being farthest from the origin has an angular resolution of 20 PPD.

It will be appreciated that the standard log-polar coordinate system is related to the Cartesian coordinate system in a manner that the given input pixel having (x, y) coordinates in the Cartesian coordinate system corresponds to a given pixel of the intermediate image having (ρ', θ') coordinates in the standard log-polar coordinate system according to following equations (5) and (6):

$$\rho' = \log\sqrt{x^2+y^2} \quad (5)$$

$$\theta' = \tan^{-1}\left(\frac{y}{x}\right) \quad (6)$$

It will also be appreciated that the modified log-polar coordinate system of the present disclosure is a modified version of the standard log-polar coordinate system, wherein the given input pixel having (x, y) coordinates in the Cartesian coordinate system corresponds to the given transformed pixel in the modified log-polar coordinate system according to the aforementioned equations (1) and (2), or the aforementioned equations (3) and (4). In particular, a difference between the modified log-polar coordinate system of the present disclosure and the standard log-polar coordinate system is a presence of the function of the radial distance $f(\rho)$ in computation of the angular distance in the modified log-polar coordinate system. An additional benefit of employing the modified log-polar coordinate system is that the modified log-polar coordinate system allows for detecting moving objects in a computationally-efficient manner (since optical flow vectors of the moving objects are vertical in the modified log-polar coordinate system).

Optionally, the function of the radial distance is equal to a half of the radial distance. The technical benefit of having the function of the radial distance equal to the half of the radial distance is that it facilitates in providing a regular and consistent arrangement (for example, such as in a form of a grid) of the transformed pixels in the transformed image, while maintaining pixel-locality within the transformed image (i.e., neighbouring pixels of the given input pixel in the input image and neighbouring pixels of the given transformed pixel in the transformed image are the same).

Mathematically, the function of the radial distance can be expressed as following:

$$f(\rho) = \frac{\rho}{2} \quad (7)$$

It will be appreciated that the function of the radial distance may be different than that mentioned above in the equation (7). However, a function of the radial distance that grows much faster than $\rho/2$ could diminish pixel-locality within the transformed image. This could adversely affect encoding of the transformed image into the encoded image. For example, a compression quality of the encoded image may reduce. Moreover, a function of the radial distance that grows much slower than $\rho/2$ would approach a standard log-polar coordinate system for generation of the transformed image, which would be associated with similar drawbacks as in the existing art. Thus, other similar functions (that grow almost similarly to $\rho/2$) can be employed alternatively.

In an embodiment, the at least one processor is configured to:
receive, from the display apparatus, information indicative of a gaze direction of a user; and
determine a gaze point in the input image, based on the gaze direction of the user, wherein the origin lies at the determined gaze point.

In this regard, the origin in the Cartesian coordinate system is selected dynamically according to the gaze direction of the user. According to known properties of the visual system of a user's eye, the gaze point and a region of the input image that immediately surrounds the gaze point are resolved to a much greater degree of visual detail by (a fovea of) the user's eye, as compared to a remaining region of the input image. Such a dynamic manner of selecting the origin in the Cartesian coordinate system and actively (i.e., dynamically) encoding accordingly emulates a way in which the user actively focuses within his/her field of view.

The term "gaze point" refers to a point in a visual scene represented in a given image at which the user is looking or is going to look. In an example, the gaze point may correspond to a point in a top-right portion of the input image. Notably, the user is not shown the input image or the decoded image, but is instead shown the output image (which is displayed by the display apparatus). The gaze direction of the user that is determined whilst the user views a given output image is used for determining a gaze point in an input image corresponding to a next output image. Optionally, when determining the gaze point in the input image, the at least one processor of the encoder is configured to map the gaze direction of the user to a corresponding point within the input image. Optionally, the at least one processor of the encoder is configured to send, to the display apparatus, information indicative of the gaze point. Such an information is required by (the at least one processor of) the display apparatus during subsequent decoding to generate the output image. Alternatively, optionally, the at least one processor of the display apparatus is configured to determine the gaze point, based on the gaze direction of the user.

In another embodiment, the origin lies at a centre of the input image. In this regard, the origin in the Cartesian coordinate system is selected in a fixed manner, according to the centre of the input image. In such a case, the at least one processor of the encoder is configured to determine the gaze point at the centre of the input image. Generally, a user's gaze is directed towards a centre of his/her field of view. When the user wishes to view object(s) in a periphery of his/her field of view, the user typically turns his/her head in a manner that said object(s) lie at a centre of his/her current field of view. In such a case, a central portion of the user's field of view is resolved to a much greater degree of visual detail by the fovea of the user's eye, as compared to a peripheral portion of the user's field of view. The aforesaid fixed manner of selecting the origin in the Cartesian coordinate system and encoding (in a fixed manner) accordingly emulates a way in which users generally focus within their field of view.

Once the input image is transformed into the transformed image, the transformed image is encoded into the encoded image, wherein the transformed pixels in the transformed image are compressed to form encoded pixels in the encoded image. Such a compression may be lossless or lossy. Optionally, the compression algorithm comprises at least one of: a High Efficiency Video Coding (also known as H.265 and aMPEG-H Part 2) algorithm, H. 263 algorithm, H.264 algorithm, a VP9 video codec algorithm, an AOMedia Video (AV) 1 video codec algorithm. As an example, the compression algorithm may be based on Discrete Cosine Transform. Compression algorithms are well-known in the art. It will be appreciated that any (off-the-shelf) video codec or image codec algorithm that provides lossy compression of the transformed image could be employed as the compression algorithm. It will also be appreciated that optionally the encoding of the transformed image is performed in a variable manner according to the spatially-variable resolution of the transformed image. This is described in more detail hereinafter.

In an embodiment, transformed pixels in the transformed image are arranged on a plurality of concentric spiralling paths about an origin in the log-polar coordinate system, and wherein, when encoding the transformed image into the encoded image, the at least one processor is configured to pack transformed pixels arranged on a given spiralling path in the transformed image into a corresponding column in the encoded image.

The term "spiralling path" refers to a spiral-shaped trajectory along which pixels in an image are arranged upon the aforementioned log-polar transformation. Further, the term "concentric spiralling paths" refers to curved patterns that emanate from a common origin and extend around the origin in a substantially-circular manner (for example, as a series of circular curves revolving around the common origin).

Optionally, the transformed pixels arranged on the plurality of concentric spiralling paths are packed sequentially into a plurality of columns in the encoded image. In such a case, transformed pixels of a first spiralling path are packed into a first column of the encoded image, transformed pixels of a second spiralling path adjacent to the first spiralling path are packed into a second column of the encoded image, and so on until transformed pixels of a last spiralling path are packed into a last column of the encoded image. It will be appreciated that the first column is one of: a left-most column, a right-most column, in the encoded image. It will also be appreciated that transformed pixels arranged on adjacent spiralling paths are packed into corresponding adjacent columns in the encoded image.

In another embodiment, transformed pixels in the transformed image are arranged on a plurality of concentric spiralling paths about an origin in the log-polar coordinate system, and wherein, when encoding the transformed image into the encoded image, the at least one processor is configured to pack transformed pixels arranged on a given spiralling path in the transformed image into a corresponding row in the encoded image. Optionally, in this regard, the transformed pixels arranged on the plurality of concentric spiralling paths are packed sequentially into a plurality of rows in the encoded image. In such a case, transformed pixels of a first spiralling path are packed into a first row of the encoded image, transformed pixels of a second spiralling path adjacent to the first spiralling path are packed into a second row of the encoded image, and so on until transformed pixels of a last spiralling path are packed into a last row of the encoded image. It will be appreciated that the first row is one of: a top-most row, a bottom-most row, in the encoded image. It will also be appreciated that transformed pixels arranged on adjacent spiralling paths are packed into corresponding adjacent rows in the encoded image.

The term "packing" refers to an image processing technique in which the transformed pixels arranged on the given spiralling path are compressed, and are arranged in the encoded image in a manner that said pixels are packed into one column of the encoded image or into one row of the encoded image. In other words, the transformed pixels arranged on the plurality of spiralling paths are compressed, and are arranged in the encoded image either in a column-wise manner or in a row-wise manner, as described above.

Optionally, when packing the transformed pixels arranged on the given spiralling path in the transformed image, an extent of compression varies along the given spiralling path, based on a distance between a given transformed pixel arranged on the given spiralling path and the origin in the log-polar coordinate system. In this regard, the extent of compression is lesser for pixels that are arranged closer to (i.e., in vicinity of) the origin, as compared to pixels that are arranged away from (i.e., far from) the origin.

In an example, 12 transformed pixels may be arranged on the given spiralling path in the transformed image. Notably, the size of pixels could increase on going away from the origin, such that pixels that are closer to the origin are smaller in size, while pixels that are away from the origin are larger in size. This is particularly applicable for a case where the transformed image has a spatially-variable resolution. When packing the 12 transformed pixels, the extent of compression may be 25 percent for four transformed pixels that are closest to the origin in the log-polar coordinate system. The extent of compression may be 75 percent for four transformed pixels that are farthest from the origin, and the extent of compression may be 50 percent for four transformed pixels that are at an intermediate distance from the origin.

Upon encoding, the encoded image is communicated to the display apparatus for subsequent decoding. It will be appreciated that the aforesaid communication occurs in real time or near-real time (i.e., without any latency/delay), and in a bandwidth-efficient manner.

Notably, the display apparatus implements a corresponding decoder. The term "decoder" refers to a specialized equipment that, in operation, decodes encoded images. The decoder decodes the encoded image to yield the decoded image. Throughout the present disclosure, the term "decoded image" refers to an image that is to be transformed from the log-polar coordinate system into the Cartesian coordinate system to generate the output image. Notably, decoded pixels of the decoded image have coordinates in the modified log-polar coordinate system. It will be appreciated that the encoded image is received from the encoder in real time or near-real time.

Upon receiving the encoded image, the encoded image is decoded into the decoded image, wherein the encoded pixels in the encoded image are decompressed to form the decoded pixels in the decoded image. The decompression algorithm corresponds to the compression algorithm that was employed when encoding the transformed image into the encoded image. In other words, the at least one processor employs a decompression algorithm that is well-compatible with a compression algorithm (that was employed when encoding the transformed image into the encoded image). Decompression algorithms are well-known in the art.

Optionally, in the display apparatus, when decoding the encoded image into the decoded image, the at least one processor is configured to unpack each column in the encoded image into decoded pixels arranged on a corresponding spiralling path in the decoded image, wherein decoded pixels in the decoded image are arranged on a plurality of concentric spiralling paths about an origin in the log-polar coordinate system.

Optionally, in this regard, the plurality of columns in the encoded image are unpacked sequentially into the decoded pixels arranged on the plurality of spiralling paths in the decoded image. In such a case, decoded pixels of a first spiralling path are unpacked from a first column of the encoded image, decoded pixels of a second spiralling path adjacent to the first spiralling path are unpacked from a second column of the encoded image, and so on until decoded pixels of a last spiralling path are unpacked from a last column of the encoded image. It will be appreciated that the first column is one of: a left-most column, a right-most column, in the encoded image. It will also be appreciated that decoded pixels arranged on adjacent spiralling paths are unpacked from corresponding adjacent columns in the encoded image.

Alternatively, optionally, in the display apparatus, when decoding the encoded image into the decoded image, the at least one processor is configured to unpack each row in the encoded image into decoded pixels arranged on a corresponding spiralling path in the decoded image, wherein decoded pixels in the decoded image are arranged on a plurality of concentric spiralling paths about an origin in the log-polar coordinate system.

Optionally, in this regard, the plurality of rows in the encoded image are unpacked sequentially into decoded pixels arranged on the plurality of spiralling paths in the decoded image. In such a case, decoded pixels of a first spiralling path are unpacked from a first row of the encoded image, decoded pixels of a second spiralling path adjacent to the first spiralling path are unpacked from a second row of the encoded image, and so on until decoded pixels of a last spiralling path are unpacked from a last row of the encoded image. It will be appreciated that the first row is one of: a top-most row, a bottom-most row, in the encoded image. It will also be appreciated that decoded pixels arranged on adjacent spiralling paths are unpacked from corresponding adjacent rows in the encoded image.

The term "unpacking" refers to an image processing technique in which encoded pixels in each column of the encoded image or encoded pixels in each row of the encoded image are decompressed, and are arranged on the corresponding spiralling path in the decoded image. In other words, the encoded pixels in the encoded image are decompressed either in a column-wise manner or in a row-wise manner, as described above, and are accordingly arranged on the plurality of spiralling paths in the decoded image.

Optionally, when unpacking the decoded pixels arranged on the given spiralling path in the decoded image, an extent of decompression varies along the given spiralling path, based on a distance between a given encoded pixel arranged on the given spiralling path and the origin in the log-polar coordinate system. In this regard, the extent of decompression is lesser for pixels that are arranged closer to (i.e., in vicinity of) the origin, as compared to pixels that are arranged away from (i.e., far from) the origin.

Throughout the present disclosure, the term "output image" refers to an image that is to be generated upon transforming the decoded image from the modified log-polar coordinate system to the Cartesian coordinate system. Notably, output pixels of the output image have coordinates in the Cartesian coordinate system. The output image is shown to the user of the display apparatus, via the at least one light source. Optionally, the output image is an XR image.

Notably, the transformation of the given decoded pixel into the given output pixel refers to a conversion of log-polar coordinates of the given decoded pixel into Cartesian coordinates of the given output pixel, using the inverse log-polar transformation. Mathematically, the x-coordinate and the y-coordinate of the given output pixel can be expressed as following:

$$x = e^\rho \cos(\theta - f(\rho)) \quad (8)$$

$$y = e^\rho \sin(\theta - f(\rho)) \quad (9)$$

Optionally, in the display apparatus, the function of the radial distance is equal to a half of the radial distance. The technical benefit of having the function of the radial distance equal to the half of the radial distance is that it facilitates in providing a regular and consistent arrangement (for example, such as in a form of a grid) of the output pixels in the output image, while maintaining pixel-locality within the output image (i.e., neighbouring pixels of the given decoded pixel in the decoded image and neighbouring pixels of the given output pixel in the output image are the same). Mathematically, the function of the radial distance can be expressed by the aforementioned equation (7).

In an embodiment, the display apparatus further comprises the gaze-tracking means, wherein the at least one processor is configured to:
  process gaze-tracking data, collected by the gaze-tracking means, to detect a gaze direction of a user; and
  send, to the encoder, information indicative of the gaze direction of the user, wherein an origin in the log-polar coordinate system lies at a gaze point in the decoded image that is determined based on the gaze direction of the user.

In this regard, the origin in the log-polar coordinate system is selected dynamically according to the gaze direction of the user. Such a dynamic manner of selecting the origin in the log-polar coordinate system and actively (i.e., dynamically) decoding accordingly emulates a way in which the user actively focuses within his/her field of view. It will be appreciated that the information indicative of the gaze direction of the user is sent to the encoder in real time or near-real time (i.e., without any latency/delay). Optionally, when determining the gaze point in the decoded image, the at least one processor is configured to map the gaze direction of the user to a corresponding point within the decoded image.

Furthermore, the term "gaze-tracking means" refers to a specialized equipment for detecting and/or following a gaze of the user's eye, when the display apparatus in operation is worn by the user on his/her head. The gaze-tracking means could be implemented as contact lenses with sensors, cameras monitoring a position of a pupil of the user's eye, and the like. Such gaze-tracking means are well-known in the art. The gaze-tracking data collected by the gaze-tracking means constitutes the information indicative of the gaze direction of the user, said information comprising at least one of: eye-tracking data, gaze vector. It will be appreciated that the gaze-tracking data is collected repeatedly by the gaze-tracking means throughout a given session of using the display apparatus, as gaze of the user's eye keeps changing whilst he/she uses the display apparatus. An up-to-date gaze-tracking data (indicative of up-to-date gaze direction of the user) allows for determining an up-to-date gaze point.

In another embodiment, in the display apparatus, an origin in the log-polar coordinate system lies at a centre of the decoded image. In this regard, the origin in the log-polar coordinate system is selected in a fixed manner, according to the centre of the decoded image. In such a case, the at least one processor of the display apparatus is configured to determine the gaze point at the centre of the decoded image. The aforesaid fixed manner of selecting the origin in the log-polar coordinate system and decoding (in a fixed manner) emulates a way in which users generally focus within their field of view.

Upon generating the output image, the at least one processor of the display apparatus is configured to display the output image via the at least one light source, the at least one processor being communicably coupled to the at least one light source. The term "light source" refers to an element from which light emanates. Optionally, a given light source is implemented as a display. In this regard, an output image is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, a given light source is implemented as a projector. In this regard, an output image is projected onto a projection screen or directly onto a retina of the user's eyes. Examples of such a projector include, but are not limited to, an LCD-based projector, an LED-based projector, an OLED-based projector, an LCoS-based projector, a Digital Light Processing (DLP)-based projector, and a laser projector.

The present disclosure also relates to the method as described above. Various embodiments and variants disclosed above, with respect to the aforementioned first aspect, apply mutatis mutandis to the method.

Optionally, the method further comprises:
  receiving, from the display apparatus, information indicative of a gaze direction of a user; and
  determining a gaze point in the input image, based on the gaze direction of the user, wherein the origin lies at the determined gaze point.

Optionally, in the method, the origin lies at a centre of the input image.

Optionally, in the method, the function of the radial distance is equal to a half of the radial distance.

Optionally, pixels in the transformed image are arranged on a plurality of concentric spiralling paths about an origin in the log-polar coordinate system, and wherein the step of encoding the transformed image into the encoded image comprises packing pixels arranged on a given spiralling path in the transformed image into a corresponding column in the encoded image.

Alternatively, optionally, pixels in the transformed image are arranged on a plurality of concentric spiralling paths about an origin in the log-polar coordinate system, and wherein the step of encoding the transformed image into the encoded image comprises packing pixels arranged on a given spiralling path in the transformed image into a corresponding row in the encoded image.

The present disclosure also relates to the display apparatus as described above. Various embodiments and variants disclosed above, with respect to the aforementioned first aspect and the second aspect, apply mutatis mutandis to the display apparatus.

DETAILED DESCRIPTION OF THE DRAWINGS

Referring to FIG. 1, illustrated is a block diagram of an architecture of an encoder 100 for encoding images by employing a modified log-polar coordinate system, in accordance with an embodiment of the present disclosure. The encoder 100 comprises at least one processor (depicted as a processor 102). The processor 102 is communicably coupled to a display apparatus 104.

It may be understood by a person skilled in the art that the FIG. 1 includes a simplified architecture of the encoder 100 for sake of clarity, which should not unduly limit the scope of the claims herein. It is to be understood that the specific implementation of the encoder 100 is provided as an example and is not to be construed as limiting it to specific numbers or types of processors. The person skilled in the art will recognize many variations, alternatives, and modifications of embodiments of the present disclosure.

Figure 2:
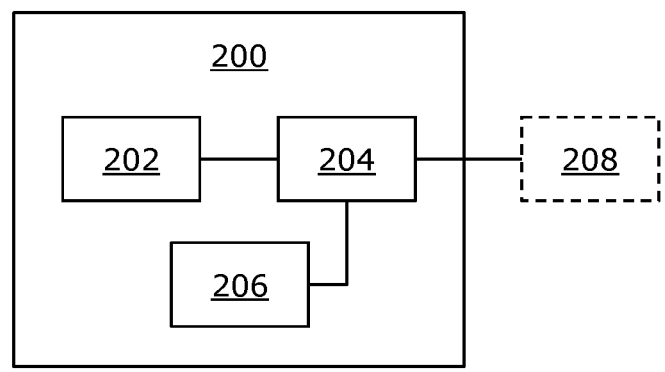
FIG. 2 illustrates a block diagram of an architecture of a display apparatus implementing a decoder for decoding images by employing a modified log-polar coordinate system, in accordance with an embodiment of the present disclosure.

Referring to FIG. 2, illustrated is a block diagram of an architecture of a display apparatus 200 implementing a decoder for decoding images by employing a modified log-polar coordinate system, in accordance with an embodiment of the present disclosure. The display apparatus 200 comprises at least one light source (depicted as a light source 202) and at least one processor (depicted as a processor 204). Optionally, the display apparatus 200 further comprises gaze-tracking means 206. The processor 204 is communicably coupled to the light source 202, the gaze-tracking means 206, and to an encoder 208.

It may be understood by a person skilled in the art that the FIG. 2 includes a simplified architecture of the display apparatus 200 for sake of clarity, which should not unduly limit the scope of the claims herein. It is to be understood that the specific implementation of the display apparatus 200 is provided as an example and is not to be construed as limiting it to specific numbers or types of light sources and processors. The person skilled in the art will recognize many variations, alternatives, and modifications of embodiments of the present disclosure.

Figures 3A, 3B:
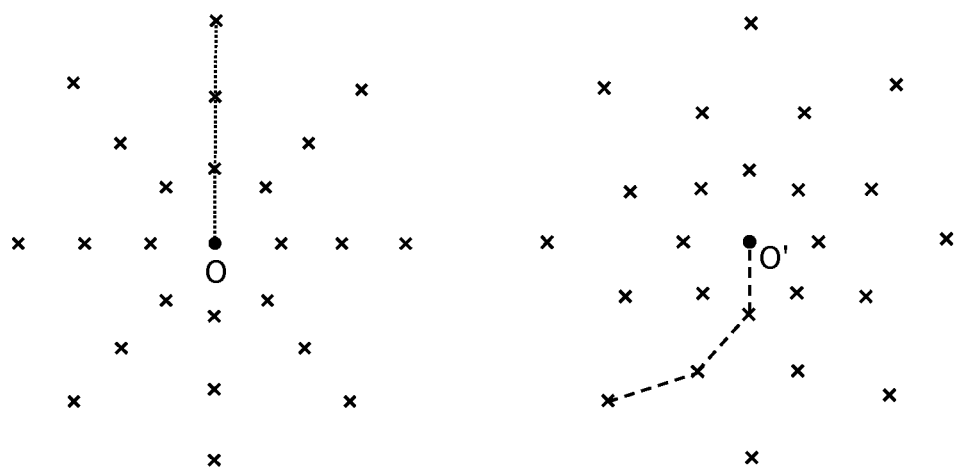

Referring to FIGS. 3A and 3B, FIG. 3A illustrates an exemplary arrangement of pixels (depicted using symbol 'x') of an image having coordinates in a standard log-polar coordinate system, and FIG. 3B illustrates an exemplary arrangement of pixels of a transformed image having coordinates in a modified log-polar coordinate system of the present disclosure. In FIG. 3A, the pixels are arranged on a plurality of concentric circles about an origin O in the standard log-polar coordinate system. Herein, pixels arranged on any two adjacent concentric circles lie along a straight line (for example, such as depicted by a dotted line) in a radial direction. In FIG. 3B, the pixels are arranged on a plurality of concentric spiralling paths (for example, such as depicted by a dashed line) about an origin O' in the modified log-polar coordinate system. Such an arrangement is optionally obtained by: converting an input image (not shown) in the Cartesian coordinate system into an intermediate image (not shown) in a standard log-polar coordinate system, wherein pixels of the intermediate image are arranged in a plurality of concentric circles whose centre is at an origin of the standard log-polar coordinate system; and rotating each concentric circle angularly about said origin by a corresponding angle-of-rotation.

Figure 4A:
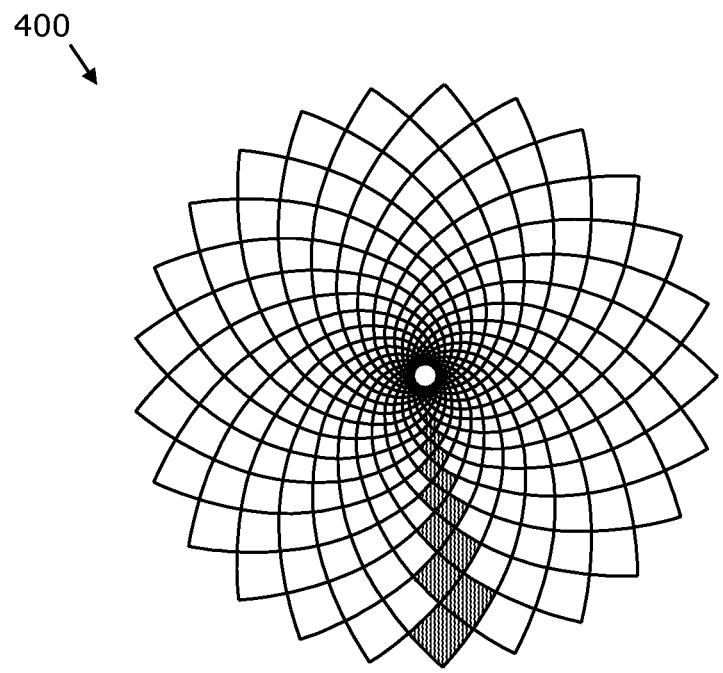
Figure 4B:
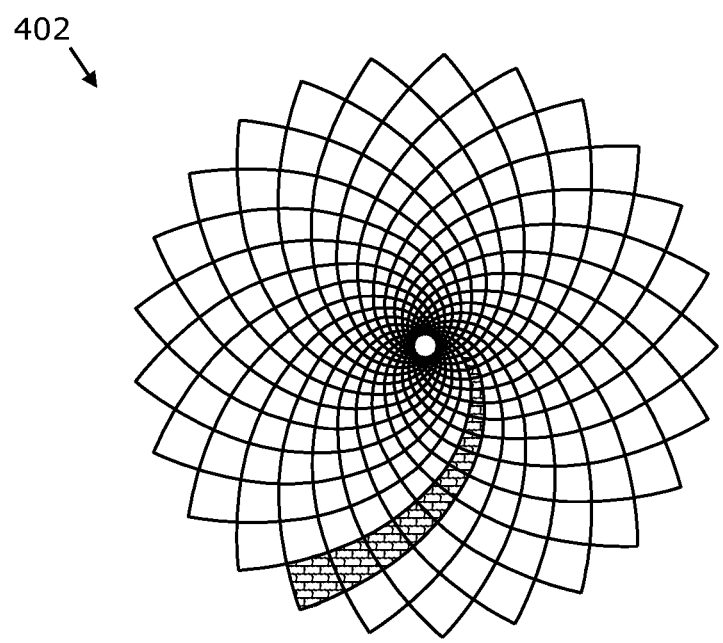
FIG. 4B illustrates how pixels of a transformed image having coordinates in a modified log-polar coordinate system of the present disclosure are encoded.

Referring to FIGS. 4A and 4B, FIG. 4A illustrates how pixels of an image 400 having coordinates in a standard log-polar coordinate system are encoded, and FIG. 4B illustrates how pixels of a transformed image 402 having coordinates in a modified log-polar coordinate system of the present disclosure are encoded. With reference to FIG. 4A, pixels along a radial dimension in the image 400 are packed into a corresponding row/column in an encoded image, and pixels along an angular dimension in the image 400 are packed into a corresponding column/row in the encoded image. Thus, the pixels are encoded according to a sawtooth pattern (depicted by a vertical stripes pattern). With reference to FIG. 4B, the transformed image 402 is encoded into an encoded image by packing pixels arranged on a given spiralling path (depicted by a horizontal brick pattern) in the transformed image 402 into a corresponding column (or into a corresponding row) in the encoded image. Thus, the pixels are encoded according to a smooth spiral pattern (as shown by the horizontal brick pattern).

Figure 5A:
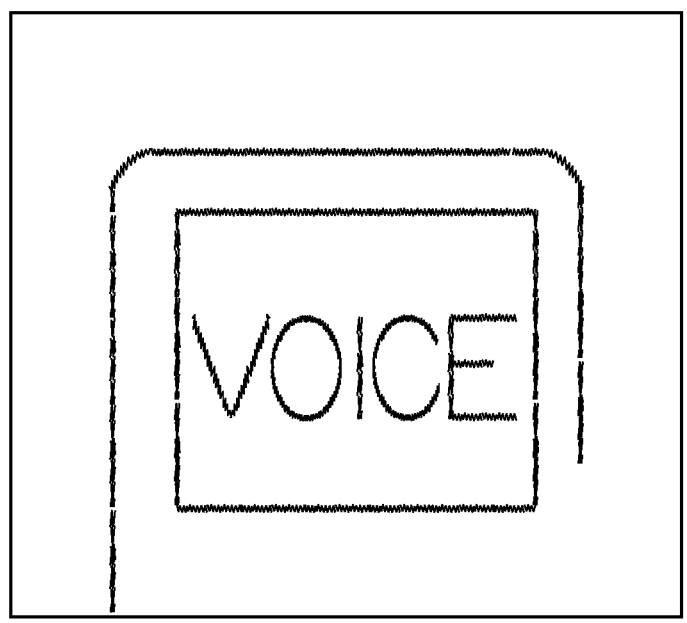
Figure 5B:
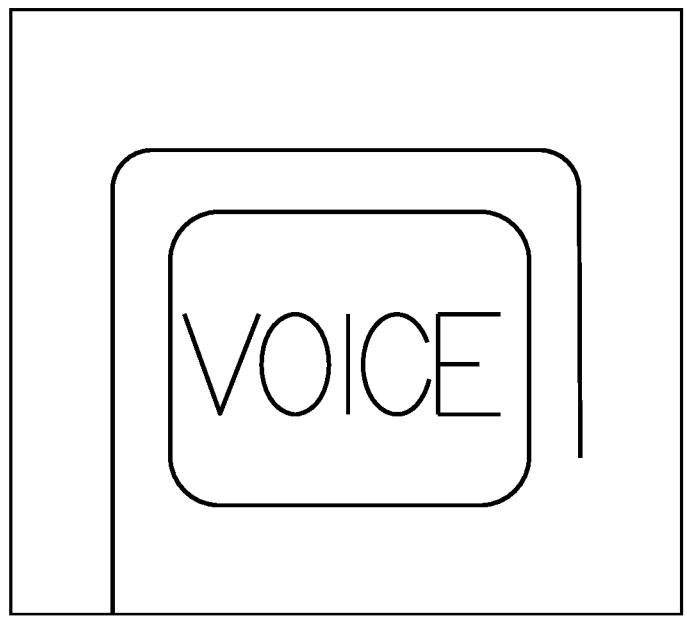
FIG. 5B illustrates an output image generated upon encoding and subsequent decoding of the input image that was transformed according to a modified log-polar coordinate system of the present disclosure.

Referring to FIGS. 5A and 5B, FIG. 5A illustrates an image 500 generated upon encoding and subsequent decoding of an input image (not shown) that was transformed according to a standard log-polar coordinate system, and FIG. 5B illustrates an output image 502 generated upon encoding and subsequent decoding of the input image that was transformed according to a modified log-polar coordinate system of the present disclosure. With reference to FIG. 5A, straight lines in the input image appear to have a sawtooth pattern in the output image 500 as locations of pixels in a single scanline in the given image correspond to a sawtooth pattern. Such a sawtooth pattern behaves like an extra high-frequency feature (such as an edge, a corner, or similar). With reference to FIG. 5B, straight lines in the input image appear as straight lines in the output image 502 as pixels in the output image 502 are arranged in a spiral manner to provide a smooth and gradual appearance of edges and corners represented by the pixels.

It may be understood by a person skilled in the art that the FIGS. 3A, 3B, 4A, 4B, 5A, and 5B are merely examples, which should not unduly limit the scope of the claims herein.

The person skilled in the art will recognize many variations, alternatives, and modifications of embodiments of the present disclosure.

Figure 6:
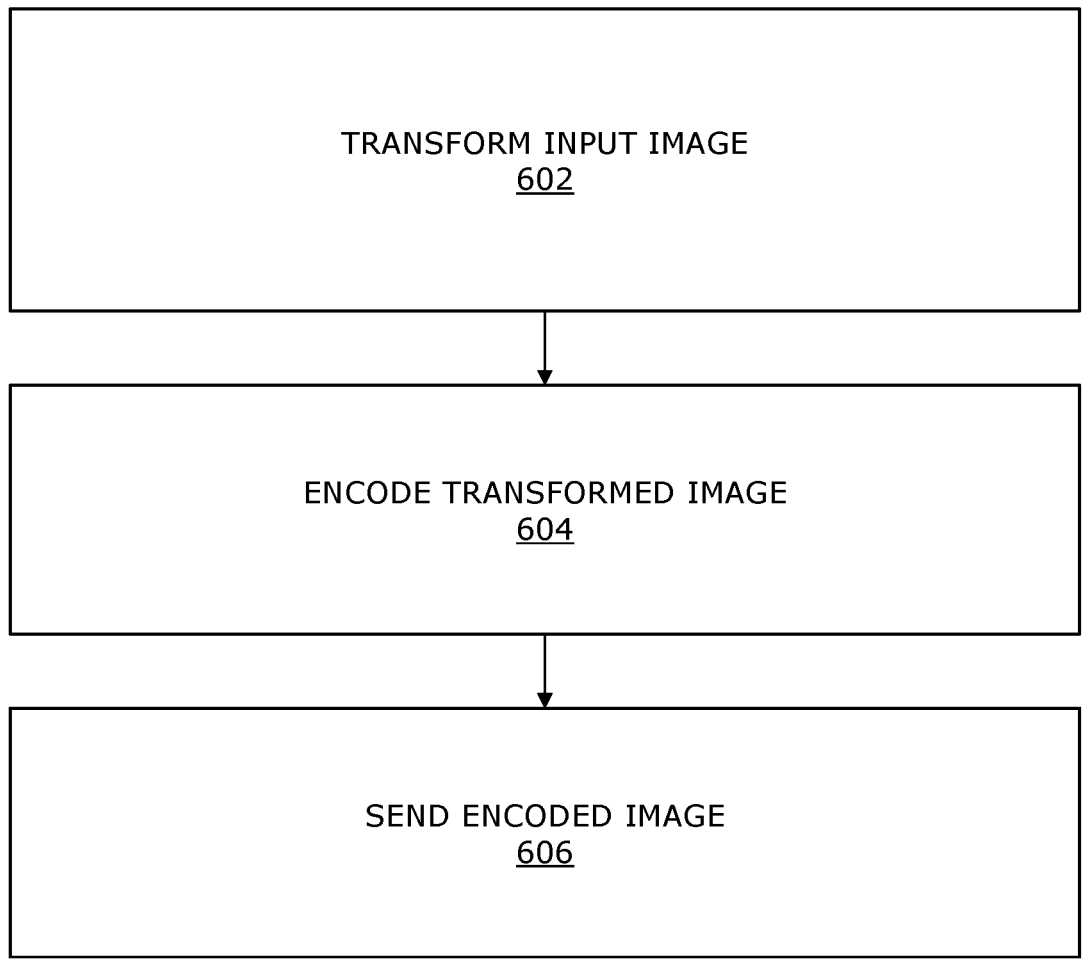
FIG. 6 illustrates steps of a method for encoding images by employing a modified log-polar coordinate system, in accordance with an embodiment of the present disclosure.

Referring to FIG. 6, illustrated are steps of a method for encoding images by employing a modified log-polar coordinate system, in accordance with an embodiment of the present disclosure. At step 602, a given input pixel of an input image having (x, y) coordinates in a Cartesian coordinate system is transformed into a given transformed pixel of a transformed image having (ρ, θ) coordinates in a log-polar coordinate system, using a log-polar transformation in which a radial distance (ρ) of the given transformed pixel is a logarithm of a distance of the given input pixel from an origin in the Cartesian coordinate system, and an angular distance (θ) of the given transformed pixel is a sum of an arctangent of a slope of a line connecting the given input pixel to the origin and a function of the radial distance. At step 604, the transformed image is encoded, by employing a compression algorithm, into an encoded image. At step 606, the encoded image is sent to a display apparatus for subsequent decoding thereat.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An encoder for encoding images, the encoder comprising at least one processor configured to:
   transform a given input pixel of an input image having (x, y) coordinates in a Cartesian coordinate system into a given transformed pixel of a transformed image having (ρ, θ) coordinates in a log-polar coordinate system, using a log-polar transformation in which a radial distance (ρ) of the given transformed pixel is a logarithm of a distance of the given input pixel from an origin in the Cartesian coordinate system, and an angular distance (θ) of the given transformed pixel is a sum of an arctangent of a slope of a line connecting the given input pixel to the origin and a function of the radial distance;
   encode the transformed image, by employing a compression algorithm, into an encoded image; and
   send the encoded image to a display apparatus for subsequent decoding thereat;
   wherein the function of the radial distance is equal to a half of the radial distance.

2. The encoder of claim 1, wherein the at least one processor is configured to:
   receive, from the display apparatus, information indicative of a gaze direction of a user; and
   determine a gaze point in the input image, based on the gaze direction of the user, wherein the origin lies at the determined gaze point.

3. The encoder of claim 1, wherein the origin lies at a centre of the input image.

4. The encoder of claim 1, wherein transformed pixels in the transformed image are arranged on a plurality of concentric spiralling paths about an origin in the log-polar coordinate system, and wherein, when encoding the transformed image into the encoded image, the at least one processor is configured to pack transformed pixels arranged on a given spiralling path in the transformed image into a corresponding column in the encoded image.

5. The encoder of claim 1, wherein transformed pixels in the transformed image are arranged on a plurality of concentric spiralling paths about an origin in the log-polar coordinate system, and wherein, when encoding the transformed image into the encoded image, the at least one processor is configured to pack transformed pixels arranged on a given spiralling path in the transformed image into a corresponding row in the encoded image.

6. A method for encoding images, the method comprising:
   transforming a given input pixel of an input image having (x, y) coordinates in a Cartesian coordinate system into a given transformed pixel of a transformed image having (ρ, θ) coordinates in a log-polar coordinate system, using a log-polar transformation in which a radial distance (ρ) of the given transformed pixel is a logarithm of a distance of the given input pixel from an origin in the Cartesian coordinate system, and an angular distance (θ) of the given transformed pixel is a sum of an arctangent of a slope of a line connecting the given input pixel to the origin and a function of the radial distance;
   encoding the transformed image, by employing a compression algorithm, into an encoded image; and
   sending the encoded image to a display apparatus for subsequent decoding thereat;
   wherein the function of the radial distance is equal to a half of the radial distance.

7. The method of claim 6, further comprising:
   receiving, from the display apparatus, information indicative of a gaze direction of a user; and
   determining a gaze point in the input image, based on the gaze direction of the user, wherein the origin lies at the determined gaze point.

8. The method of claim 6, wherein the origin lies at a centre of the input image.

9. The method of claim 6, wherein transformed pixels in the transformed image are arranged on a plurality of concentric spiralling paths about an origin in the log-polar coordinate system, and wherein the step of encoding the transformed image into the encoded image comprises packing transformed pixels arranged on a given spiralling path in the transformed image into a corresponding column in the encoded image.

10. The method of claim 6, wherein transformed pixels in the transformed image are arranged on a plurality of concentric spiralling paths about an origin in the log-polar coordinate system, and wherein the step of encoding the transformed image into the encoded image comprises packing transformed pixels arranged on a given spiralling path in the transformed image into a corresponding row in the encoded image.

11. A display apparatus comprising at least one light source and at least one processor configured to:
   receive an encoded image from an encoder;
   decode the encoded image, by employing a decompression algorithm, into a decoded image;
   transform a given decoded pixel of the decoded image having (ρ, θ) coordinates in a log-polar coordinate system into a given output pixel of an output image having (x, y) coordinates in a Cartesian coordinate system, using an inverse log-polar transformation in which an x-coordinate of the given output pixel is a product of an antilogarithm of a radial distance (ρ) of the given decoded pixel and a cosine of a difference between an angular distance (θ) of the given decoded pixel and a function of the radial distance, and a y-coordinate of the given output pixel is a product of the antilogarithm of the radial distance of the given decoded pixel and a sine of the difference between the angular distance and the function of the radial distance; and display the output image via the at least one light source;

wherein the function of the radial distance is equal to a half of the radial distance.

12. The display apparatus of claim 11, further comprising a gaze-tracking means, wherein the at least one processor is configured to:

process gaze-tracking data, collected by the gaze-tracking means, to detect a gaze direction of a user; and send, to the encoder, information indicative of the gaze direction of the user, wherein an origin in the log-polar coordinate system lies at a gaze point in the decoded image that is determined based on the gaze direction of the user.

13. The display apparatus of claim 11, wherein an origin in the log-polar coordinate system lies at a centre of the decoded image.

14. The display apparatus of claim 11, wherein, when decoding the encoded image into the decoded image, the at least one processor is configured to unpack each column in the encoded image into decoded pixels arranged on a corresponding spiralling path in the decoded image, wherein decoded pixels in the decoded image are arranged on a plurality of concentric spiralling paths about an origin in the log-polar coordinate system.

15. The display apparatus of claim 11, wherein, when decoding the encoded image into the decoded image, the at least one processor is configured to unpack each row in the encoded image into decoded pixels arranged on a corresponding spiralling path in the decoded image, wherein decoded pixels in the decoded image are arranged on a plurality of concentric spiralling paths about an origin in the log-polar coordinate system.

* * * * *